(12) United States Patent
Cheng

(10) Patent No.: US 8,977,328 B2
(45) Date of Patent: Mar. 10, 2015

(54) WRAPPING DEVICE FOR A CELL PHONE

(71) Applicant: Shen-Hsin Cheng, Tianzhong Township (TW)

(72) Inventor: Shen-Hsin Cheng, Tianzhong Township (TW)

( * ) Notice: Subject to any disclaimer, the term of this patent is extended or adjusted under 35 U.S.C. 154(b) by 20 days.

(21) Appl. No.: 14/017,424

(22) Filed: Sep. 4, 2013

(65) Prior Publication Data

US 2014/0200055 A1    Jul. 17, 2014

(30) Foreign Application Priority Data

Jan. 17, 2013   (TW) .............................. 102201021 U

(51) Int. Cl.
*H04B 1/38*     (2006.01)
*H04M 1/02*    (2006.01)
*H04M 1/18*    (2006.01)

(52) U.S. Cl.
CPC ........... *H04B 1/3888* (2013.01); *H04M 1/0283* (2013.01); *H04M 1/185* (2013.01)
USPC .................... 455/575.8; 455/575.1; 455/90.3; 455/347

(58) Field of Classification Search
CPC ... H04B 1/3888; H04M 1/0283; H04M 1/185
USPC ........................... 455/575.1, 575.8, 90.3, 347
See application file for complete search history.

(56) References Cited

U.S. PATENT DOCUMENTS

| | | | |
|---|---|---|---|
| 2011/0141390 A1* | 6/2011 | Lee et al. | 349/58 |
| 2013/0098549 A1* | 4/2013 | Drage et al. | 156/308.6 |
| 2014/0041799 A1* | 2/2014 | Nam | 156/247 |

\* cited by examiner

*Primary Examiner* — Tuan Pham
(74) *Attorney, Agent, or Firm* — The Weintraub Group, P.L.C.

(57) ABSTRACT

A wrapping device for a cell phone has a holder and a wrapping sticker. The holder has a paper recess and a cell phone chamber. The paper recess is formed in a front surface of the holder. The cell phone chamber is formed through a bottom face of the paper recess. The wrapping sticker is mounted in the holder and has a backing paper and a protective film. The backing paper is mounted in the paper recess and has two tearing lines, a tear-off paper and a cutting line. The tearing lines are formed in an external surface of the backing paper beside a midline of the backing paper. The tear-off paper is formed on the backing paper between the tearing lines. The cutting line is formed in the external surface of the backing paper. The protective film is detachably mounted on the external surface of the backing paper.

1 Claim, 7 Drawing Sheets

WRAPPING DEVICE FOR A CELL PHONE

BACKGROUND OF THE INVENTION

1. Field of the Invention

The present invention relates to a wrapping device, and more particularly to a wrapping device for a cell phone that can wrap the cell phone quickly and can provide a preferred wrapping quality.

2. Description of Related Art

The conventional method of wrapping a cell phone comprises preparing a protective film in a shape corresponding to a back cover of the cell phone, cutting four marks respectively on the corners of the protective film, attaching the protective film onto a central portion of the back cover of the cell phone and pressing the surrounding sides and the corners of the protective film onto the sides and the corners of the back cover of the cell phone.

Although the conventional wrapping method can wrap the protective film onto the back cover of the cell phone to provide protection to the back cover of the cell phone, there is no positioning structure between the back cover and the protective film. When the protective film is attached onto the back cover of the cell phone, the protective film needs to be aligned with the back cover repetitively and this is time-consuming and inconvenient. Further, the wrapping quality depends mainly on the personal skill of the operator so may not be steadily reliable.

Additionally, the marks are respectively cut on the corners of the protective film, and the corners of the protective film are respectively attached onto the corners of the back cover. However, in use, the corners of the back cover are often touched or even hit and this will make corners of the protective film ripped off from the corners of the back cover of the cell phone and affect the protective effect of the protective film.

To overcome the shortcomings, the present invention provides a wrapping device to mitigate or obviate the aforementioned problems.

SUMMARY OF THE INVENTION

The main objective of the present invention is to provide a wrapping device for a cell phone that can wrap the cell phone quickly and can provide a preferred wrapping quality.

The wrapping device for a cell phone in accordance with the present invention has a holder and a wrapping sticker. The holder has a paper recess and a cell phone chamber. The paper recess is formed in a front surface of the holder. The cell phone chamber is formed through a bottom face of the paper recess. The wrapping sticker is detachably mounted in the holder and has a backing paper and a protective film. The backing paper is mounted in the paper recess to cover the cell phone chamber and has two tearing lines, a tear-off paper and a cutting line. The tearing lines are formed in an external surface of the backing paper without cutting off the backing paper beside a midline of the backing paper and are parallel to each other at an interval. The tear-off paper is formed on the backing paper between the tearing lines. The cutting line is formed in the external surface of the backing paper. The protective film is detachably mounted on the external surface of the backing paper.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
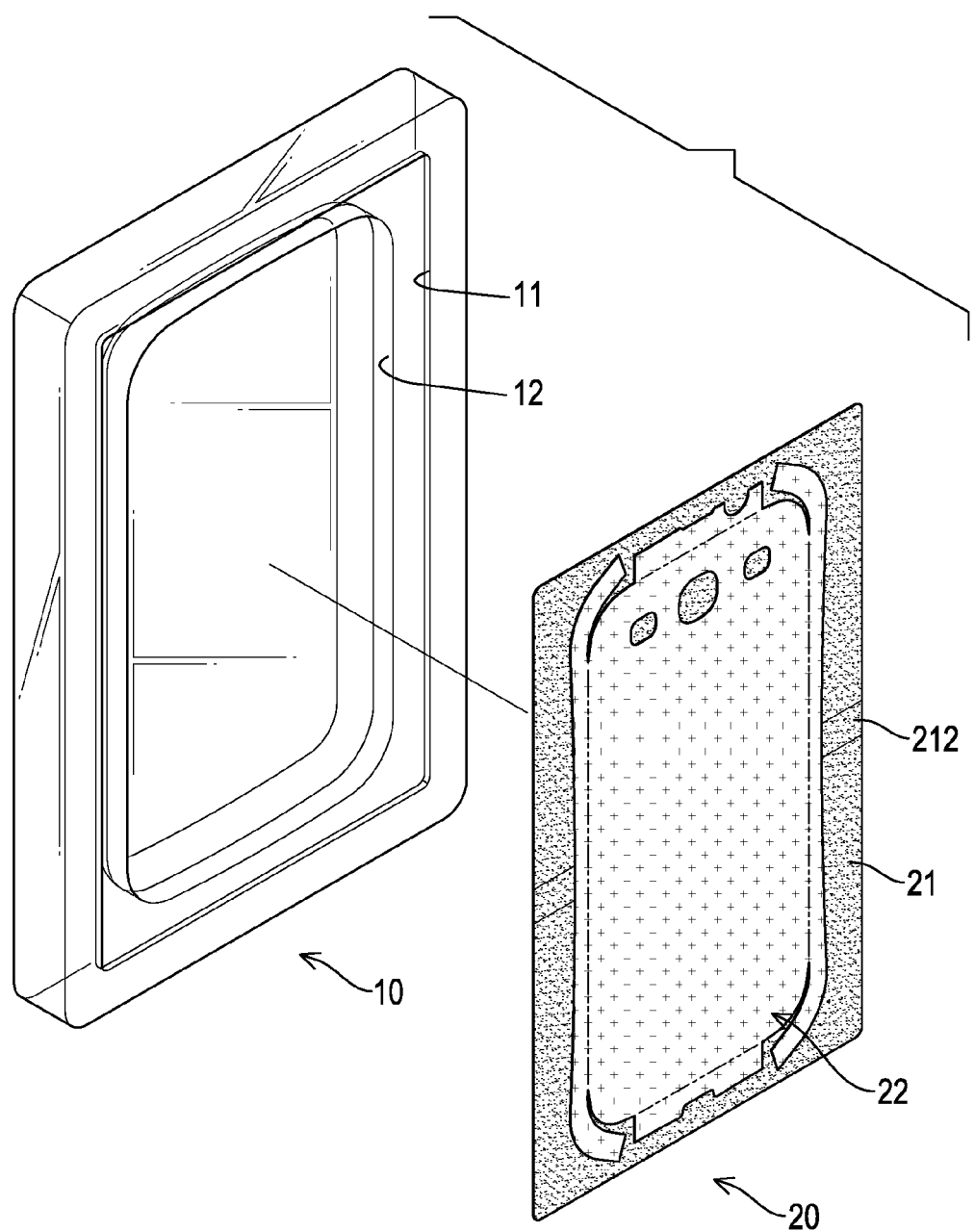
FIG. 1 is an exploded perspective view of a wrapping device for a cell phone in accordance with the present invention.

With reference to FIGS. 1 to 4, a wrapping device for a cell phone in accordance with the present invention comprises a holder 10 and a wrapping sticker 20.

The holder 10 may be a rectangular plastic casing, or can be made of metal or wood, and has a middle, a front surface, a paper recess 11 and a cell phone chamber 12.

The paper recess 11 is formed in the front surface of the holder 10 at the middle of the holder 10 and has a middle, a bottom face, a size, a depth, and a shape corresponding to the holder 10.

The cell phone chamber 12 is formed through the bottom face of the paper recess 11 at the middle of the paper recess 11 and has a size smaller than the size of the paper recess 11, a depth deeper than the depth of the paper recess 11, and a shape corresponding to the shape of the paper recess 11.

The wrapping sticker 20 is detachably mounted in the holder 10 and has a backing paper 21 and a protective film 22.

The backing paper 21 is mounted in the paper recess 11 of the holder 10 to cover the cell phone chamber 12 and has a size, a shape, a midline, an internal surface, an external surface, two tearing lines 211, a tear-off paper 212 and a cutting line 213. The size and shape of the backing paper 21 are approximate to the size and shape of the paper recess 11. The internal surface of the backing paper 21 faces the cell phone chamber 12. The tearing lines 211 are formed in the external surface of the backing paper 21 without cutting off the backing paper 21 beside the midline of the backing paper 21 and are parallel to each other at an interval. In addition, the tearing lines 211 divide the backing paper 21 into three segments, including an upper segment, a middle segment and a lower segment. The tear-off paper 212 is formed on the middle segment of the backing paper 21 between the tearing lines 211. The cutting line 213 is formed in the external surface of the backing paper 21 without cutting off the backing paper 21 and has a contour.

Figure 4:
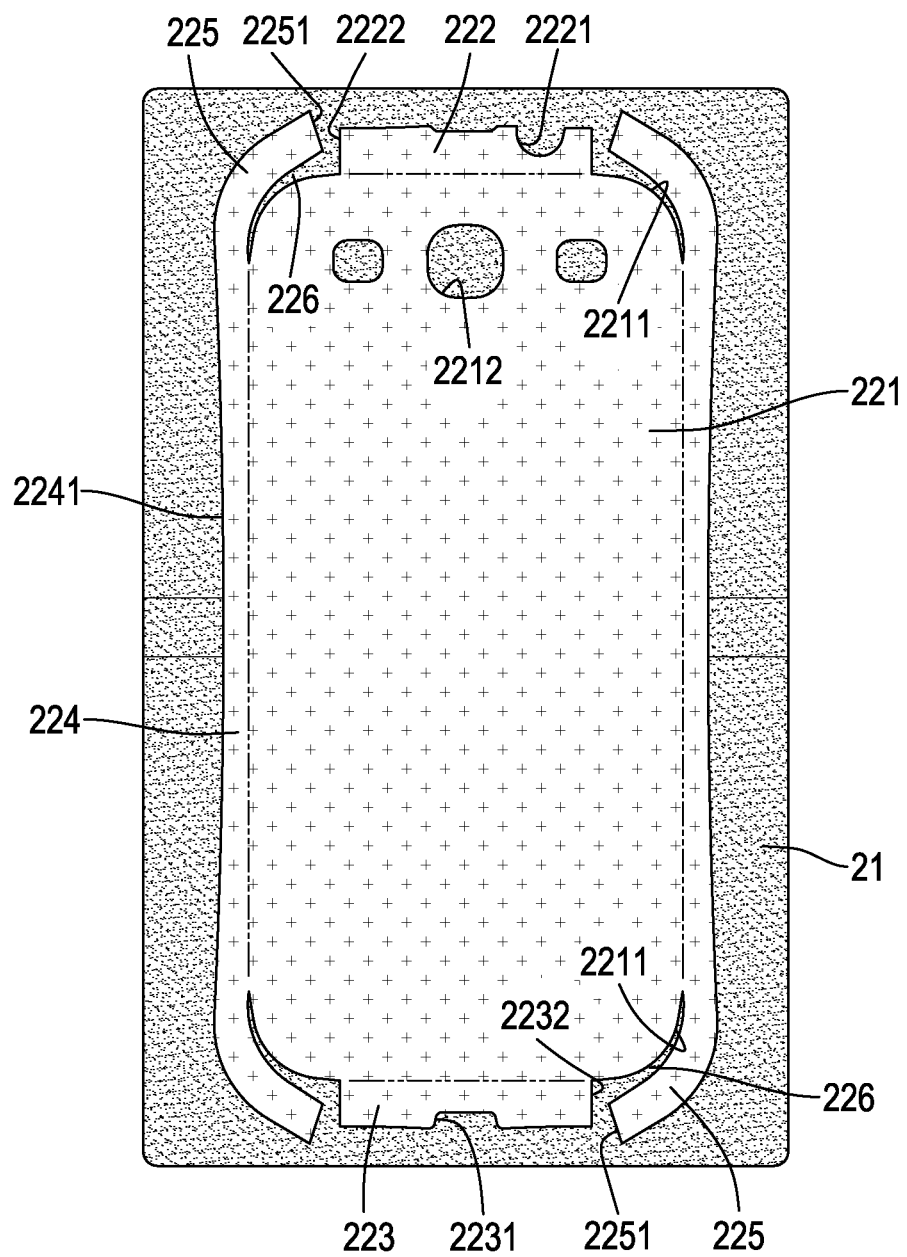
FIG. 4 is a front side view of a wrapping sticker of the wrapping device in FIG. 1.

With further reference to FIG. 4, the protective film 22 is detachably mounted on the external surface of the backing paper 21, aligns with the cell phone chamber 12 and is a plastic sheet made of polyvinyl ethylene (PVC), polycarbonate (PC), thermoplastic polyurethane (TPU) or polyurethane (PU). The protective film 22 has a size, a shape, an inner surface, an outer surface, a main pasting sheet 221, an upper pasting sheet 222, a lower pasting sheet 223, two side pasting sheets 224, four end pasting sheets 225 and four curved openings 226. The inner surface of the protective film 22 is adhesive and is attached to the external surface of the backing paper 21. The size of the protective film 22 is approximate to the size of the cell phone chamber 12. The shape of the protective film 22 is corresponding to the contour of the cutting line 213 of the backing paper 21.

The main pasting sheet 221 is rectangular, is mounted on the external surface of the backing paper 21 and has an upper edge, a lower edge, two side edges, four corners, four curved edges 2211 and at least one through hole 2212. The curved edges 2211 are respectively formed on the corners of the main pasting sheet 221, and each one of the curved edges 2211 has a length. The at least one through hole 2212 is formed through the main pasting sheet 221 near the upper edge of the main pasting sheet 221.

The upper pasting sheet 222 is formed with the upper edge of the main pasting sheet 221 between two of the curved edges 2211 that are formed on the upper edge of the main pasting sheet 221 and has a lower edge, an upper edge, two opposite sides, an earphone-jack notch 2221, and two connecting edges 2222. The lower edge of the upper pasting sheet 222 is formed with the upper edge of the main pasting sheet 221. The earphone-jack notch 2221 is formed in the upper edge of the upper pasting sheet 222. The connecting edges 2222 are respectively formed on the opposite sides of the upper pasting sheet 222, respectively near the two of the curved edges 2211 that are formed on the upper edge of the main pasting sheet 221 and each one of the connecting edges 2222 has a width.

The lower pasting sheet 223 is formed with the lower edge of the main pasting sheet 221 between two of the curved edges 2211 that are formed on the lower edge of the main pasting sheet 221 and has an upper edge, a lower edge, two opposite sides, a transmission-hole notch 2231 and two connecting edges 2232. The upper edge of the lower pasting sheet 223 is formed with the lower edge of the main pasting sheet 221. The transmission-hole notch 2231 is formed in the lower edge of the lower pasting sheet 223. The connecting edges 2232 are respectively formed on the opposite sides of the lower pasting sheet 223, respectively near the two of the curved edges 2211 that are formed on the lower edge of the main pasting sheet 221 and each one of the connecting edges 2232 has a width.

The side pasting sheets 224 are respectively formed with the side edges of the main pasting sheet 221 between the curved edges 2211, and each one of the side pasting sheets 224 has an inner side, an outer side, an upper end, a lower end and a concave edge 2241. The inner sides of the side pasting sheets 224 are respectively formed with the side edges of the main pasting sheet 221. The concave edge 2241 is formed on the outer side of the side pasting sheet 224.

The end pasting sheets 225 are curved, are respectively formed with the upper ends and the lower ends of the side pasting sheets 224 near the curved edges 2211 of the main pasting sheet 221, and each one of the end pasting sheets 225 has an inner side, a free end and a linking edge 2251. The inner side of the end pasting sheet 225 faces to one adjacent curved edge 2211 of the main pasting sheet 221 with an interval and has a length equal to the length of said adjacent curved edge 2211 of the main pasting sheet 221. The free ends of the end pasting sheets 225 extend to one of the connecting edges 2222, 2232 of the upper pasting sheet 222 and the lower pasting sheet 223. The linking edge 2251 is formed with the free end of the end pasting sheet 225 and has a width equal to the width of one adjacent connecting edge 2222, 2232 of the upper pasting sheet 222 and the lower pasting sheet 223.

The curved openings 226 are formed through the protective film 22 between the inner sides of the end pasting sheets 225 and the curved edges 2211 of the main pasting sheet 221 and are gradually expanded from the side pasting sheets 224 toward the upper pasting sheet 222 or the lower pasting sheet 223.

Figure 2:
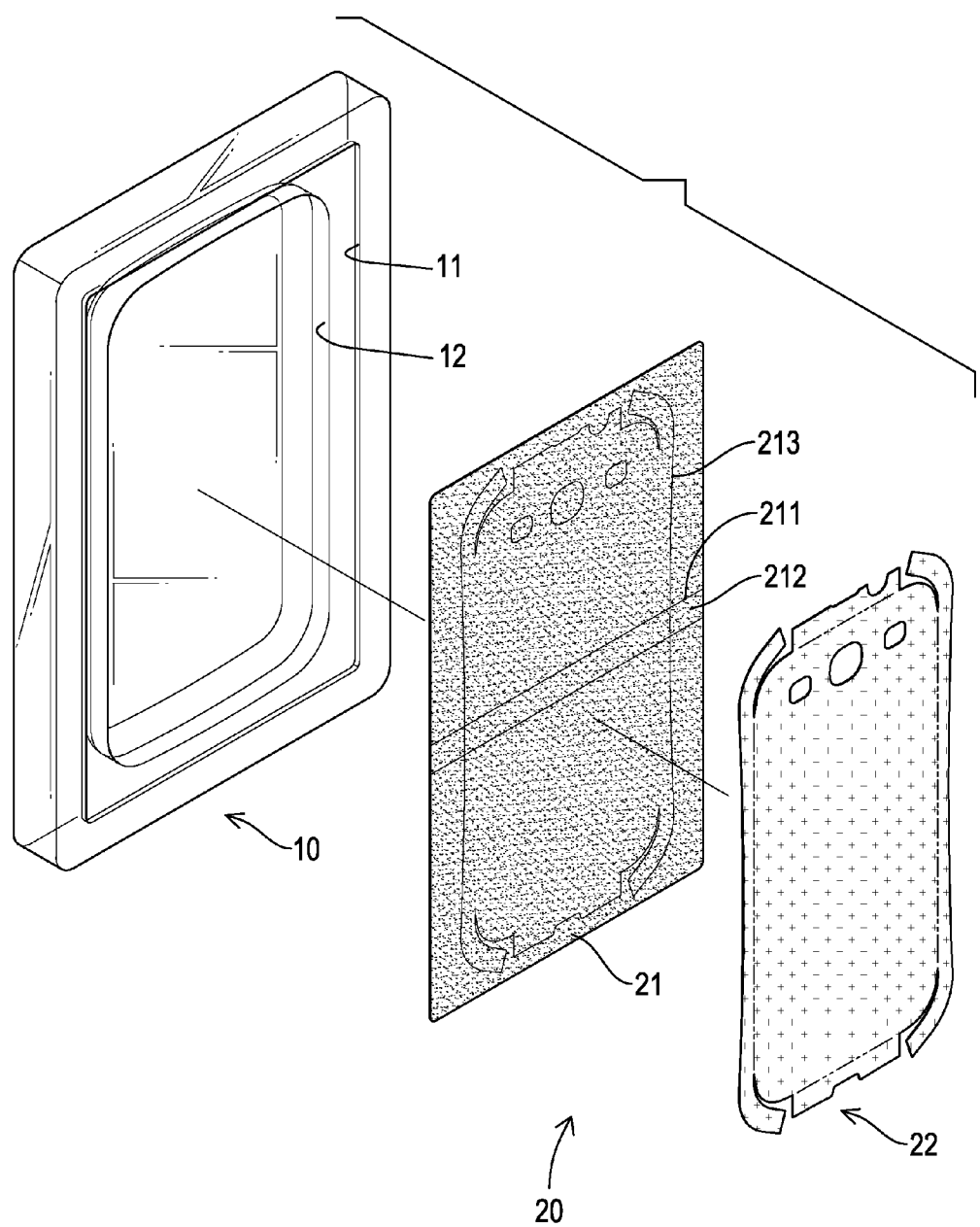
FIG. 2 is a further exploded perspective view of a wrapping device for a cell phone in FIG. 1.
Figure 3:
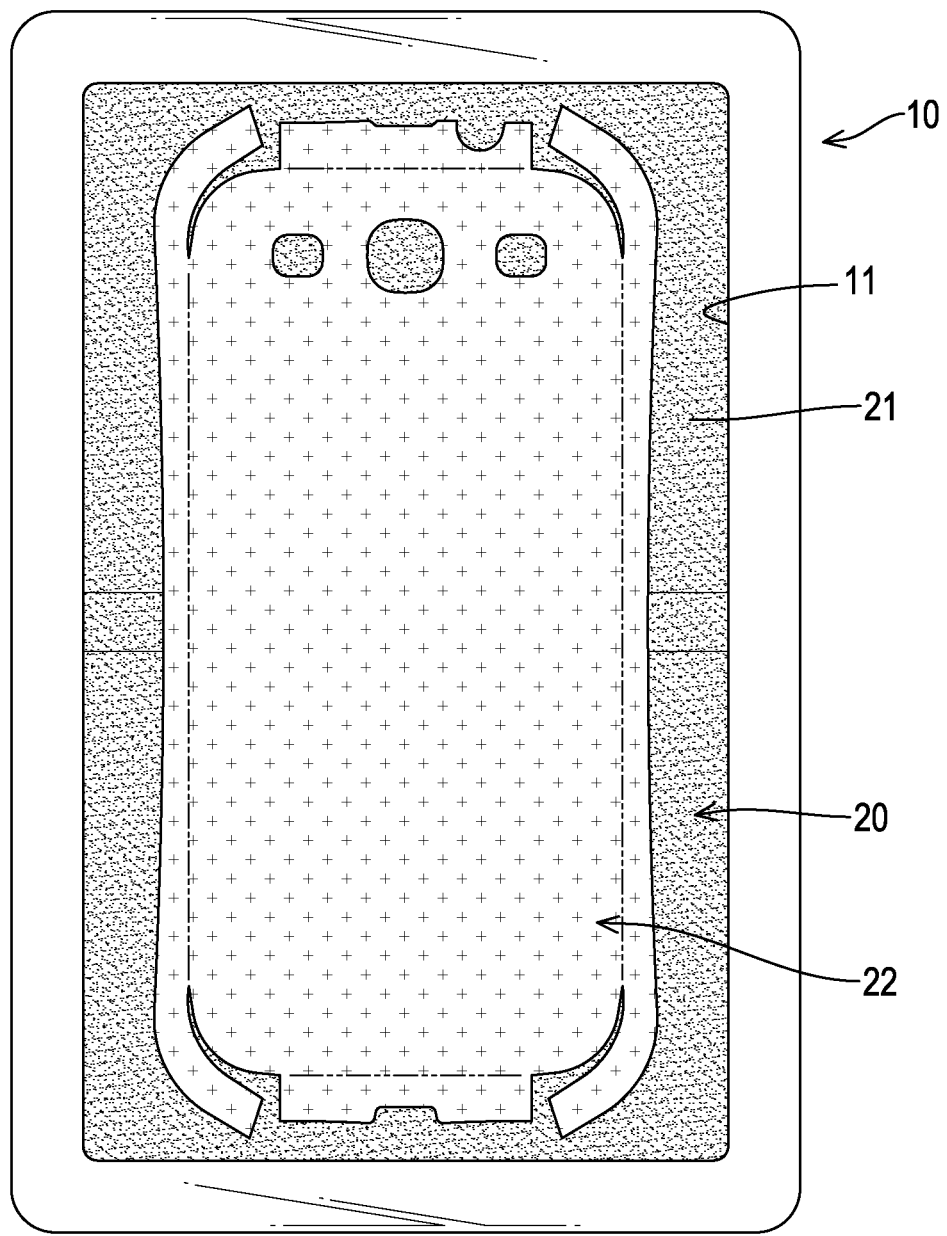
FIG. 3 is a front side view of a wrapping device for a cell phone in accordance with the present invention.
Figure 5:
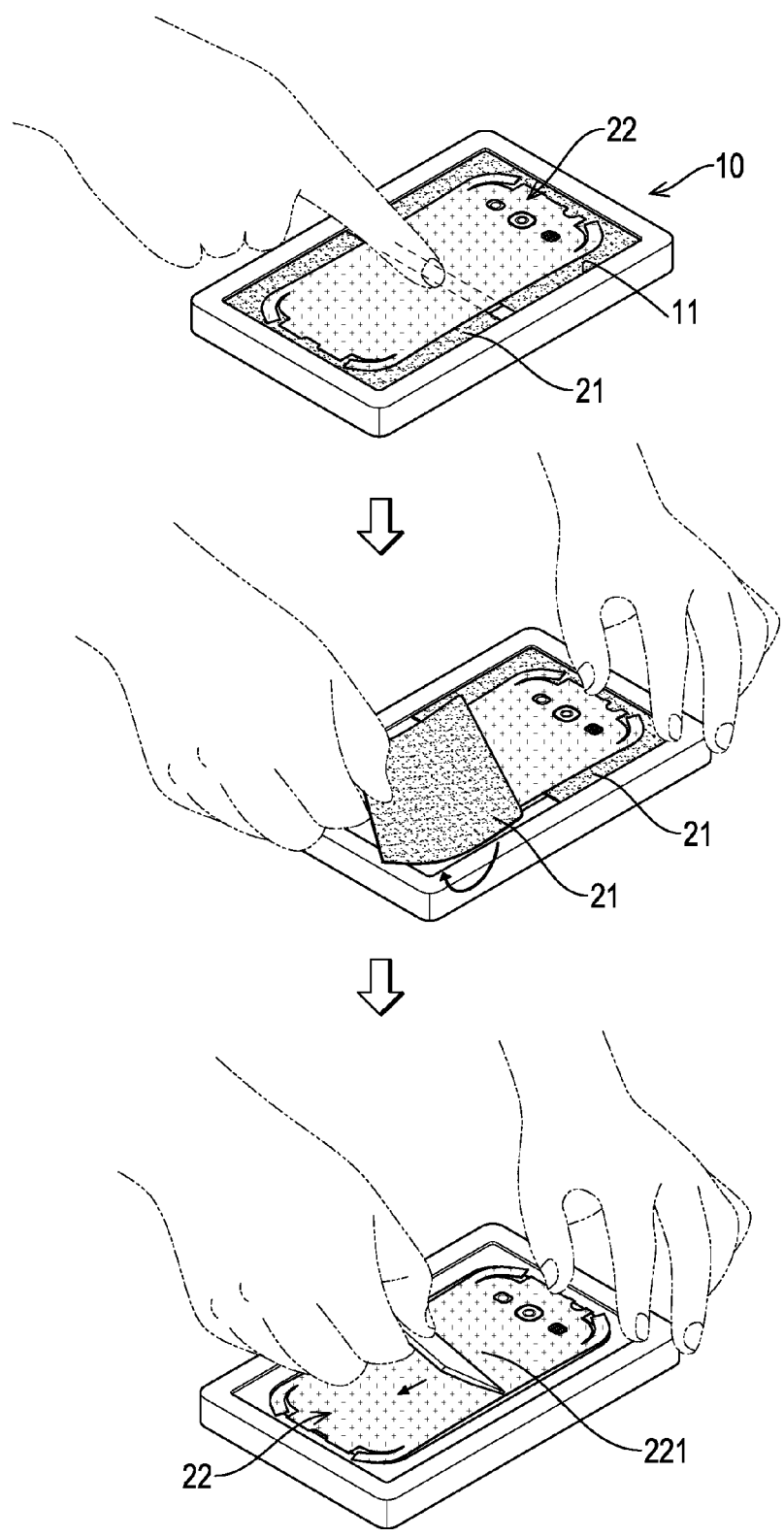
FIGS. 5 and 6 are operational perspective views of the wrapping device in FIG. 1.

With reference to FIGS. 1, 2 and 5, when the wrapping device is in use on a back cover of a cell phone, the wrapping sticker 20 is removed from the holder 10, and the cell phone is put in the cell phone chamber 12 of the holder 10 with the back cover of the cell phone facing the internal surface of the backing paper 21. Then, the tear-off paper 212 is torn off from the backing paper 21 by the tearing lines 211 to enable a part of the protective film 22 to face the back cover of the cell phone between the upper segment and the lower segment of the backing paper 21.

After the tear-off paper 212 is torn off from the backing paper 21, the wrapping sticker 20 is manually put back and is positioned by the paper recess 11 to enable the part of the protective film 22 to stick on and located in the back cover of the cell phone. When the part of the protective film 22 is positioned on the back cover of the cell phone, the user can tear off the lower segment and the upper segment of the backing paper 22 from the protective film 22 sequentially. Then, the main pasting sheet 221 of the protective film 22 can be securely pasted on the back cover of the cell phone by hands, blades or other tools. In addition, at this time, the upper pasting sheet 222, the lower pasting sheet 223, the side pasting sheets 224 and the end pasting sheets 225 are not yet pasted on the back cover of the cell phone.

Figure 6:
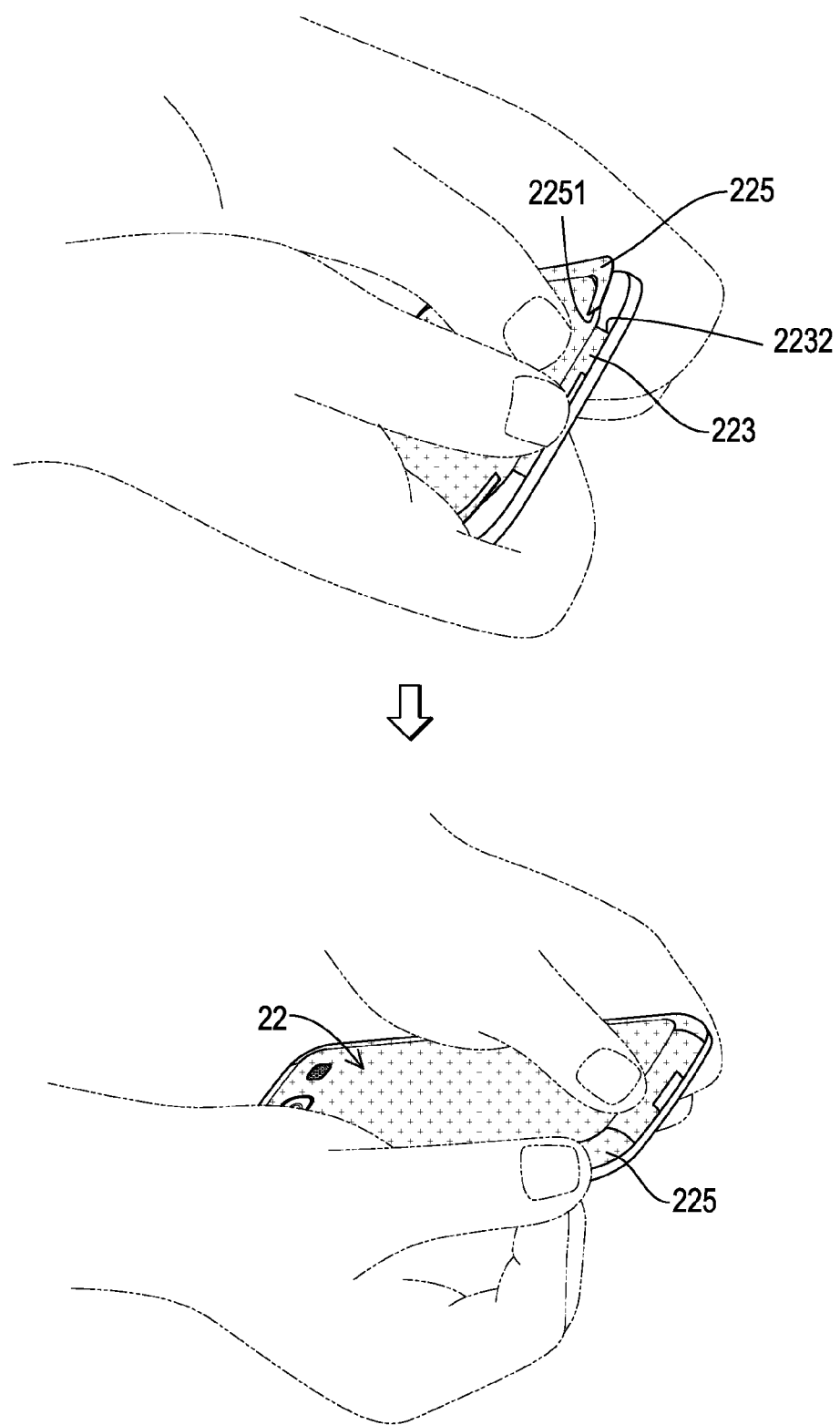
Figure 7:
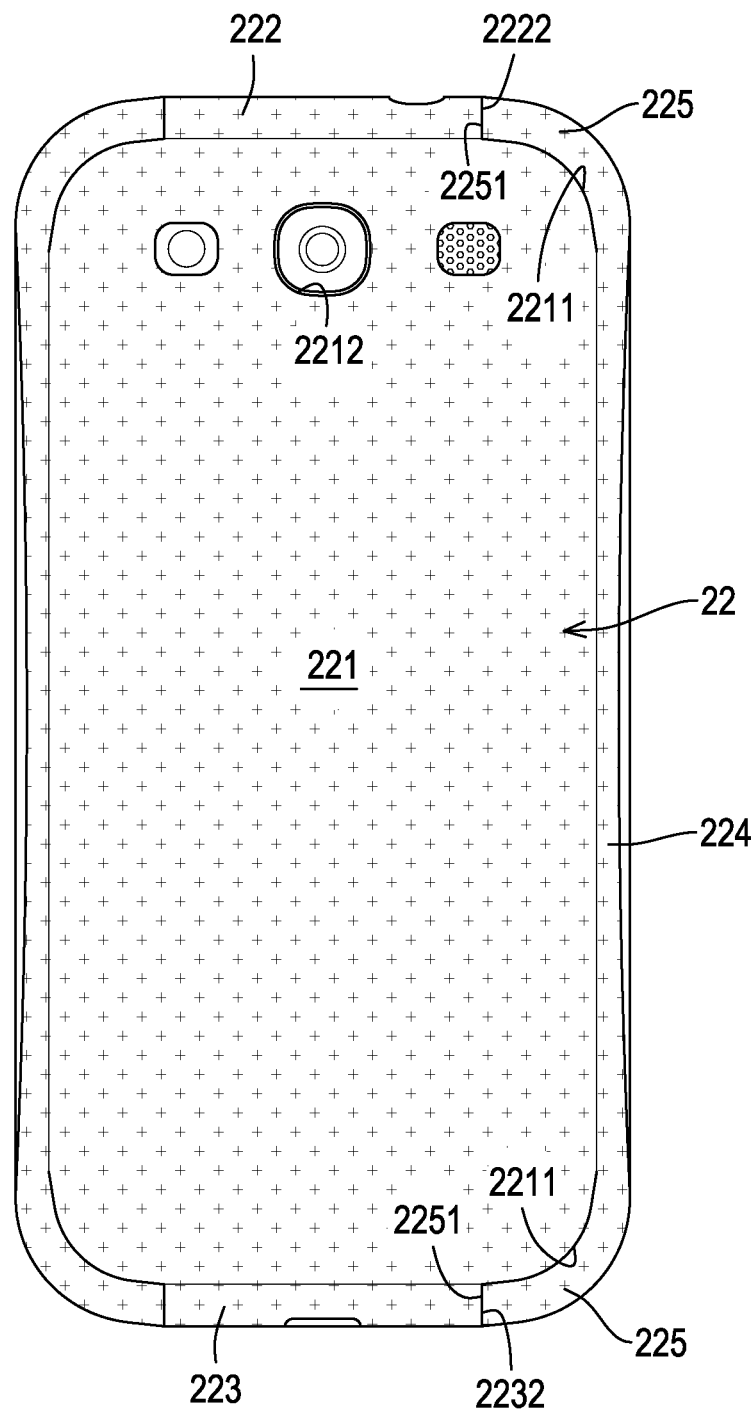
FIG. 7 is a rear side view of a protective film of the wrapping sticker in FIG. 2, attached onto a back cover of a cell phone.

With reference to FIG. 6, the cell phone with the protective film 22 is removed from the holder 10, and the side pasting sheets 224, the upper pasting sheet 222, the lower pasting sheet 223 and the end pasting sheets 225 are sequentially pressed to be pasted on the back cover of the cell phone to enable the inner sides of the end pasting sheets 225 to connect with the curved edges 2211 of the main pasting sheet 221 and to enable the linking edges 2251 of the end pasting sheets 225 to connect with the connecting edges 2222, 2232 of the upper pasting sheet 222 and the lower pasting sheet 223. Then, the pasting sheets 222, 223, 224, 225 can be pasted surrounding the back cover of the cell phone completely to provide a preferred protective effect to the cell phone.

The backing paper 21 mounted with the protective film 22 can provide a positioning effect to the protective film 22 when mounted in the paper recess 11 of the holder 10 and can be torn off easily. As such, the protective film 22 can be pasted on the back cover of the cell phone accurately and quickly without aligning the protective film with the back cover of the cell phone repetitively. Consequently, the protective film 22 can be pasted on the back cover of the cell phone accurately and quickly by the holder 10 and the backing paper 21 of the wrapping sticker 20, even for end-users without professional skills, and this is time-saving and convenient for the general consumers.

Furthermore, the end pasting sheets 225 are curved to fit with the corners of the back cover of the cell phone and this can enable the end pasting sheets 225 to be pasted on the corners of the back cover of the cell phone without stretching and therefore can completely avoid backward contracting of the end pasting sheets 225. In addition, the connecting positions of the inner sides of the end pasting sheets 225, the curved edges 2211 of the main pasting sheet 221, the linking edges 2251 of the end pasting sheets 225 and the connecting edges 2222, 2232 of the upper pasting sheet 222 and the lower pasting sheet 223 are misaligned with the corners of the back cover of the cell phone, and the end pasting sheets 225 can be pasted on the corners of the back cover of the cell phone smoothly and completely and this can prevent the protective film 22 from being ripped off from the back cover of the cell phone easily and can provide a preferred wrapping quality to the back cover of the cell phone.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A wrapping device for a cell phone comprising:
a holder having
    a middle;
    a front surface;
    a paper recess formed in the front surface of the holder at the middle of the holder and having a middle, a bottom face and a shape; and
    a cell phone chamber being rectangular, formed through the bottom face of the paper recess at the middle of the paper recess and having a size; and
a wrapping sticker detachably mounted in the holder and having
    a backing paper mounted in the paper recess of the holder to cover the cell phone chamber and having
        a shape corresponding to the shape of the paper recess;
        a midline;
        an internal surface facing the cell phone chamber;
        an external surface;
        two tearing lines formed in the external surface of the backing paper without cutting off the backing paper beside the midline of the backing paper and being parallel to each other at an interval;
        a tear-off paper formed on the backing paper between the tearing lines; and
        a cutting line formed in the external surface of the backing paper without cutting off the backing paper and having a contour; and
    a protective film detachably mounted on the external surface of the backing paper, aligning with the cell phone chamber and having
        a size being approximate to the size of the cell phone chamber;
        a shape corresponding to the contour of the cutting line of the backing paper;
        an inner surface being adhesive and attached to the external surface of the backing paper;
    a main pasting sheet being rectangular, mounted on the external surface of the backing paper and having
        an upper edge;
        a lower edge;
        two side edges;
        four corners; and
        four curved edges respectively formed on the corners of the main pasting sheet, and each one of the curved edges having a length and at least one through hole formed through the main pasting sheet near the upper edge of the main pasting sheet; and
    an upper pasting sheet formed with the upper edge of the main pasting sheet between two of the curved edges that are formed on the upper edge of the main pasting sheet and having
        a lower edge formed with the upper edge of the main pasting sheet;
        an upper edge;
        two opposite sides;
        an earphone-jack notch formed in the upper edge of the upper pasting sheet; and
        two connecting edges respectively formed on the opposite sides of the upper pasting sheet, respectively near the two of the curved edges that are formed on the upper edge of the main pasting sheet and each one of the connecting edges having a width;
    a lower pasting sheet formed with the lower edge of the main pasting sheet between two of the curved edges that are formed on the lower edge of the main pasting sheet and having
        an upper edge formed with the lower edge of the main pasting sheet;
        a lower edge;
        two opposite sides;
        a transmission-hole notch formed in the lower edge of the lower pasting sheet; and
        two connecting edges respectively formed on the opposite sides of the lower pasting sheet, respectively near the two of the curved edges that are formed on the lower edge of the main pasting sheet and each one of the connecting edges having a width;
    two side pasting sheets respectively formed with the side edges of the main pasting sheet between the curved edges, and each one of the side pasting sheets having
        an inner side formed with one of the side edges of the main pasting sheet;
        an outer side;
        an upper end;
        a lower end; and
        a concave edge formed on the outer side of the side pasting sheet;
    four end pasting sheets being curved, respectively formed with the upper ends and the lower ends of the side pasting sheets near the curved edges of the main pasting sheet, and each one of the end pasting sheets having
        an inner side facing to one adjacent curved edge of the main pasting sheet with an interval and having a length equal to the length of said adjacent curved edge of the main pasting sheet;
        a free end extending to one of the connecting edges of the upper pasting sheet and the lower pasting sheet that is adjacent to said adjacent curved edge of the main pasting sheet; and
        a linking edge formed with the free end of the end pasting sheet and having a width equal to the width of one adjacent connecting edge of the upper pasting sheet and the lower pasting sheet; and
    four curved openings formed through the protective film between the inner sides of the end pasting sheets and the curved edges of the main pasting sheet and gradually expanded from the side pasting sheets toward the upper pasting sheet or the lower pasting sheet.

* * * * *